US010315956B2

(12) United States Patent
Morrison et al.

(10) Patent No.: US 10,315,956 B2
(45) Date of Patent: Jun. 11, 2019

(54) LIMESTONE MASONRY VENEER, RESURFACING AND AESTHETIC OVERLAY COMPOSITIONS, METHODS OF MAKING AND METHODS OF USE

(71) Applicant: StoneCoat of Texas, LLC, Addison, TX (US)

(72) Inventors: Kenneth W. Morrison, Addison, TX (US); Norman L. Hains, Arlington, TX (US)

(73) Assignee: StoneCoat of Texas, LLC, Addison, TX (US)

( * ) Notice: Subject to any disclaimer, the term of this patent is extended or adjusted under 35 U.S.C. 154(b) by 335 days.

(21) Appl. No.: 14/642,379

(22) Filed: Mar. 9, 2015

(65) Prior Publication Data

US 2015/0251953 A1    Sep. 10, 2015

Related U.S. Application Data

(60) Provisional application No. 61/949,659, filed on Mar. 7, 2014.

(51) Int. Cl.
| | |
|---|---|
| *B28C 5/12* | (2006.01) |
| *C04B 28/12* | (2006.01) |
| *E04F 13/14* | (2006.01) |
| *B44D 5/10* | (2006.01) |
| *B05B 9/04* | (2006.01) |
| *B05B 13/00* | (2006.01) |

(52) U.S. Cl.
CPC ............. *C04B 28/12* (2013.01); *B28C 5/123* (2013.01); *B44D 5/10* (2013.01); *E04F 13/147* (2013.01); *B05B 9/04* (2013.01); *B05B 13/005* (2013.01); *Y02W 30/97* (2015.05)

(58) Field of Classification Search
CPC ......... C04B 28/12; B05B 9/04; B05B 13/005; B28C 5/123; B44D 5/10; E04F 13/147
See application file for complete search history.

(56) References Cited

U.S. PATENT DOCUMENTS

| | | | | |
|---|---|---|---|---|
| 2,437,842 | A | | 3/1948 | Uhler |
| 3,854,985 | A | * | 12/1974 | Suzuki ................... C04B 28/04 |
| | | | | 106/666 |
| 3,963,508 | A | * | 6/1976 | Masaryk ............... C04B 35/101 |
| | | | | 106/693 |
| 4,390,371 | A | * | 6/1983 | Cornwell ................ B28C 5/386 |
| | | | | 106/644 |
| 6,217,646 | B1 | | 4/2001 | Gervais |
| 6,227,813 | B1 | | 5/2001 | Leimer |

FOREIGN PATENT DOCUMENTS

| | | |
|---|---|---|
| CN | 101844899 | 9/2012 |
| EP | 0378437 | 5/1994 |
| EP | 0798274 | 10/1997 |
| EP | 2770130 A1 * | 8/2014 |
| WO | WO 2009019479 | 2/2009 |
| WO | WO 2013074296 | 5/2013 |

OTHER PUBLICATIONS

CN 101844899 (dated Sep. 29, 2010) Wang et al. abstract only.*
CN 101811853 (dated Aug. 25, 2010) Wang et al. abstract only.*
CN 101844899 (dated Sep. 29, 2010) Wang et al. Machine Translation into English.*
Machine translation of EP 0798274 A1 published Oct. 1, 1997, 14 pgs.
Machine translation of CN 101844899 B published Sep. 5, 2012, 27 pgs.
Notification of Transmittal of the International Search Report and the Written Opinion of the International Searching Authority for PCT/US2015/019481, including the International Search Report and the Written Opinion of the International Searching Authority, dated Jun. 8, 2015, 11 pgs.
Transmineral USA, Inc., Mineralogy & Chemistry of Raw Materials, avalable at http://www.limes.us/technical-info/mineralogy-chemistry-of-raw-materials/, obtained Sep. 2013, 5 pgs.

* cited by examiner

*Primary Examiner* — Anthony J Green
(74) *Attorney, Agent, or Firm* — Foley & Lardner LLP

(57) ABSTRACT

A limestone based masonry veneer composition is described that may be molded, blown, sprayed, troweled, or otherwise applied to interior and exterior surfaces. The composition provides an aesthetic resurfacing, cladding and/or overlay coating. The composition is capable of being pigmented, textured, sculpted—or otherwise formed into an aesthetic, realistic, architecture, suitable as a stone veneer, an example of which is Blown Stone®, by Stone Coat®. Texturing or sculpting may occur about 1 hour and up to about 12 hours after applying the composition. The final composition is hydrophobic and breathes. Air carbonation allows the formation of a predominantly very pure calcium carbonate or limestone when fully cured, which prevents mold and algae growth and allows for autogenous healing with an increase in unit weight over time, ensuring an overall high compressive strength that endures over time.

20 Claims, 5 Drawing Sheets
(4 of 5 Drawing Sheet(s) Filed in Color)

LIMESTONE MASONRY VENEER, RESURFACING AND AESTHETIC OVERLAY COMPOSITIONS, METHODS OF MAKING AND METHODS OF USE

CROSS-REFERENCE TO RELATED APPLICATION

This application claims the benefit of U.S. Provisional Application No. 61/949,659 filed Mar. 7, 2014, the entirety of which is incorporated herein by reference.

STATEMENT REGARDING FEDERALLY SPONSORED RESEARCH OR DEVELOPMENT

None

TECHNICAL FIELD

As disclosed herein are limestone masonry veneers and methods of making said masonry veneers, including controlling their strength and time to cure in order to enhance workability and performance.

BACKGROUND

Faux (fake) stone mortars are typically cement-based mortar mixes, derived from clinker, in which limestone and clay or shale are ground together and burned to decompose the limestone and clay or shale, thereby forming dicalcium silicate and tricalcium silicate. These cement based stone mortars are not typically suitable for decorative use because the time to cure is very short and the final products when cured undergo considerable shrinkage, thereby forming deep cracks and spalls. In addition, these cement based stone mortars trap moisture in the numerous pores formed by air entrainment during spray application and can form pits from small bubbles that arise. The cement based stone mortars do not breath and purge trapped moisture within or behind the veneer after application. This creates conditions for the formation of mold between the mortar and the substrate to which it is applied, which can harm the substrate.

There remains a need to provide a masonry veneer for coating applications on interior or exterior building surfaces, for resurfacing or as one or more overlay coatings that may be suitably sculptured or shaped for aesthetic purposes while holding up under adverse weather conditions.

There also remains a need to provide a masonry veneer for use as an overlay on interior building surfaces and substrates that may be suitably sculptured and shaped and pigmented for aesthetic purposes while maintaining integrity under adverse weather conditions, including any sculpted and shaped surfaces.

SUMMARY

Described herein is a limestone based masonry veneer suitable for customization and for resurfacing interior or exterior surfaces. The limestone based veneer is for resurfacing and overlay. The described masonry veneer is, in one or more embodiments, a limestone masonry veneer that may be controlled and adjusted for curing time and strength.

In one or more embodiments, the limestone based masonry veneer is formed from a formulation comprising at least a hydraulic binder, an aggregate or filler, and optionally a reactant, which reacts with an aqueous liquid, such as water. Additional additives may be incorporated in the formulation used to provide the desired characteristics of the limestone masonry veneer. Said additives may include an accelerant, retardant, air entrainment agent, surfactant, bonding agent, water resistant agent, and strength enhancer.

In one or more embodiments, the hydraulic binder is one that solidifies with the addition of an aqueous liquid, such as water, and includes a sufficient amount of amorphous silica to form dicalcium silicate but does not form tricalcium silicate (or only minimal tricalcium silicate). The hydraulic binder will include a hydraulic lime that meets the requirements as a natural hydraulic lime (NHL) under grade NHL 2, or NHL 3.5 or NHL 5. These grades indicate the amount of soluble amorphous silica content. The natural hydraulic lime may preferably be ranked as NHL 3.5. Generally, the hydraulic binder is not quick lime. In one or more embodiments, the hydraulic binder may also include one that is capable of forming dicalcium silicate and tricalcium silicate. In some embodiments, the hydraulic binder is a combination of more than one hydraulic binder. The hydraulic binder, which includes the natural hydraulic lime, is in an amount between about 1 wt. % and about 35 wt. % of the formulation based on the dry weight. The hydraulic binder, which includes the natural hydraulic lime, may be in an amount between about 1 wt. % and about 20 wt. % of the formulation based on the dry weight. The hydraulic binder in the form of the natural hydraulic lime may be in an amount between about 1 wt. % and about 15 wt. % of the formulation based on the dry weight.

The aggregate or filler is a ground aggregate having a particle size distribution between about 6 mesh (U.S. Standard) to 20 microns and may have a more narrow particle size distribution range there between. At this particle sizing, the aggregate or filler has a pH greater than 9 (i.e., alkaline). The aggregate is preferably alkaline to prevent the formation of mold or algae. The aggregate is from a natural source. In one or more embodiments, the aggregate is calcareous, such as limestone, shale, chalk or marble. The aggregate is preferably a source of calcium carbonate limestone which is over 90% pure. The aggregate is generally considered a course aggregate, as it includes the fraction of particle sizes capable being retained on a Number 6 mesh screen (~3.36 mm) and passing through a Number 40 mesh screen (~0.4 mm) or a particular mesh screen of a size there between. The aggregate is generally in an amount between about 30 wt. % and about 90 wt. % of the formulation based on the dry weight. The aggregate or filler is preferably limestone. Sand or silicon dioxide fillers do not prevent the formation of mold or algae, and, hence are not preferred. In one or more embodiments, the filler is not primarily a siliceous aggregate, such as sand.

The reactant when included is preferably a calcium silicate hydrate material (containing siliceous and aluminous materials), one that will form calcium silicate hydrate when hydrated, such that it has a reactive surface available for an alkali or calcium hydroxide (lime) reactions. The reactant may be a material having a vitreous (glassy or amorphous, non-crystalline) phase, such as is found in silica glass, fly ash, volcanic ash, rice hull ash, and silica fume, (any pozzolan) as examples. The reactant may be cementitious. The reactant may also comprise an aluminosilicate clay. The reactant is generally finely divided, having a mean particle size of about 20 µm or less, or may be less than about 15 µm, or less than about 10 µm. The reactant may be in an amount between about 2 wt. % and about 25 wt. % of the formulation based on the dry weight.

Additives, when included in any of the formulations described herein do not generally make up more than 20 wt.

% of the formulation based on the dry weight. Often, the additives are in an amount that is about 15 wt. % of the formulation or less based on the dry weight. The additives, when included, may be in an amount that is about 5 wt. % of the formulation or less based on the dry weight. The additives, when included, may be in an amount that is about 3 wt. % of the formulation or less based on the dry weight.

In methods of making the formulation described, the formulation is blended in a mixing unit. Blending includes adding the dry ingredients, often followed by blending all of the dry ingredients, and then incorporating water to form a flowable mixture. The flowable mixture may be similar to that of a pumpable paste. The dry ingredients will include at least the hydraulic binder in powder form, the aggregate or filler in dry or powder form, and optionally the reactant in powder or dry form. Additional additives, dry or liquid, may be added to the dry ingredients when blended. Additives when in liquid form will generally be added to the blended mixture after or with the addition of water. In some embodiments, the flowable mixture may be made in batches that include about or some variation of a ratio of 1.5 gallons of water per 1 cubic foot of dry ingredients. In additional embodiments, the flowable mixture may be made in batches that include about or some variation of a ratio of 2 gallons of water per 1.5 cubic feet of dry ingredients. The method may further comprise disposing said flowable mixture on a surface or disposing said flowable mixture in a cast or mold for forming as a shaped article when fully cured. Hence, after disposing the flowable mixture on the substrate surface, the flowable mixture may be further shaped. Shaping may generally occur after about an hour after disposing the flowable mixture.

The described formulation is suitable for use as a flowable masonry veneer mixture. The flowable masonry veneer mixture described herein will generally have a solids content that is about 40% to 95% solids or greater than 40% solids. In one or more embodiments, the flowing masonry veneer mixture is of a sufficient viscosity to be applied to a surface as a coating by troweling. In other embodiments, the flowing masonry veneer mixture is of a sufficient thickness to be applied as a blown coating to a surface through an improved pump system. In additional embodiments, the flowing masonry veneer mixture is of a sufficient viscosity to be applied as a blown coating to a surface through a hand held sprayer. Said formulations when applied may be textured and/or carved, forming textured and/or carved surfaces on a substrate and providing improved surface characteristics to said substrate. The substrate and its surface may be a horizontal structure (e.g., flooring, base, body, ceiling) and/or vertical structure (e.g., vertical wall or building structure). When applied, said formulations provide an improved masonry veneer that is prevented from cracking, has an increased adhesion, especially when blown, has an increased compressive and tensile strength, and has an improved water retention for a better workability, enabling a surface to have a commercial quality and look. Said formulations may, in one or more embodiments, result in a product with greater than 90% or greater than 95% or greater than 96% limestone. The compressive strength may be up to about 2000 psi or more after a 28 day cure time. The tensile strength may be up to about 1000 psi or 7 MPa after a 28 day cure time.

In one or more forms is a formulation comprising dry ingredients that include a hydraulic binder in an amount between about 10 wt. % and about 16 wt. % based on a dry weight of the formulation, the hydraulic binder including at least a natural hydraulic lime of NHL grade 3.5 or NHL grade 5 and optionally a cementitious binder, in which the cementitious binder can replace up to 60% of the natural hydraulic lime. The dry ingredients further comprise an aggregate comprising natural limestone, the aggregate being initially screened with a mesh that is a number 6 mesh, a number 40 mesh or a mesh of a size there between, wherein the aggregate is in an amount between about 70 wt. % and about 90 wt. % based on the dry weight of the formulation. The formulation includes water, wherein the water is in an amount so that the ratio of water to cubic feet of dry ingredients is between about 1.5:1.0 to about 2.0:1.5. The cementitious binder may be in an amount between about 2 wt. % and 12 wt. % based on the dry weight of the formulation. The cementitious binder may be in an amount less than 5 wt. % based on the dry weight of the formulation. The formulation may further comprise triethanolamine in an amount between about 0.01% to 0.05% of based on the dry weight of the formulation. The formulation may further comprise an accelerant or a retardant in an amount not more than 2% based on the dry weight of the formulation. The formulation may further comprise calcium stearate or a water proofing binder in an amount between about 0.1% and 5 wt. % based on the dry weight of the formulation. The formulation may further comprise hammer milled long and strong cellulose fibers in an amount up to about 2 wt. % based on the dry weight of the formulation. The formulation may further comprise additives that make up no more than 5 wt. % based on the dry weight of the formulation. The when wet may have a solids content of between about 40 and about 65%. The cementitious binder may be in an amount between about 8 wt. % and 12 wt. % based on the dry weight of the formulation. The formulation when cured provides a coating having a calcium carbonate limestone content of at least or greater than 92%.

Also described herein is a coating composition comprising a natural hydraulic lime of NHL grade 3.5 or grade 5. The coating composition further comprises a natural limestone being finely divided with a mesh that is a number 6 mesh, a number 40 mesh or a mesh of a size there between. The coating composition further comprises a cementitious binder. The coating composition further comprises water in an amount to form a slurry having solids content of between about 65 wt. % and 90 wt. %. The natural hydraulic lime and the cementitious binder together comprising not more than 18 wt. % based on a dry weight. The coating composition is capable of stiffening in about 1 hour, such that the stiffened surface of the coating composition allows application of a decorative tool or carving tool to the stiffened surface within about 1 hour after depositing the coating composition at a thickness of between about 0.5 inches and 1.5 inches. The coating composition takes up to about 24 hours to fully set. The coating composition when fully formed has a calcium carbonate limestone content of at least 92%.

Still further as described herein is a dry formulation comprising a hydraulic binder, which includes at least a natural hydraulic lime of NHL grade 3.5 or NHL grade 5, the hydraulic binder in an amount between about 3 wt. % and about 16 wt. % based on a dry weight of the formulation. The dry formulation further comprises an aggregate comprising natural limestone, the aggregate being initially screened with a mesh that is a number 6 mesh, a number 40 mesh or a mesh of a size there between, wherein the aggregate is in an amount between about 70 wt. % and about 90 wt. % based on the dry weight of the formulation. The dry formulation further comprises calcium stearate in an amount that is between about 0.1 to about 5% of the weight of the dry formulation.

A method of applying a coating composition is also described herein. The method comprises blending dry ingredients in a mixing unit. The method further comprises adding at least water to the dry ingredients, thereby forming a flowing mixture, wherein the water is added in an amount so that the ratio of gallons of water to cubic feet of dry ingredients is between about 1.5:1.0 to about 2.0:1.5. The method further comprises transferring the flowing mixture to a first hopper, wherein the first hopper is up to about 300 feet away from a work site or up to about 75 feet below the work site. The method further comprises using a peristaltic pump to move the flowing mixture from the first hopper to at least a second hopper, wherein the peristaltic pump moves the flowing mixture at a rate of about 5 gallons per minute, and wherein the second hopper is configured to feed about 1 gallon of flowing mixture to a third hopper, wherein feed of the flowing mixture to the third hopper is operable with a gate valve and a level controller so configured to allow flow of the flowing mixture from the third hopper to a hand held apparatus.

In additional embodiments is a method of applying a coating composition comprising blending dry ingredients in a mixing unit. The method further comprises adding water to the dry ingredients, thereby forming a pumpable flowing mixture, wherein the water is added in an amount so that the ratio of gallons of water to cubic feet of dry ingredients is between about 1.5:1 to about 2.0:1.5. The method further comprises applying the pumpable flowing mixture onto an exterior or interior surface, wherein applying includes blowing the pumpable flowing-mixture to a thickness on the surface of between about 3/8 inches thick to about 2 inches thick, thereby providing a coating on the exterior or interior surface. The method further comprises allowing the coating to set for at least about one hour. The method further comprises using a decorative tool or carving tool to create grout lines in the coating. The method further comprises cleaning the coating with a brush. The method further comprises allowing the coating to fully cure. Applying includes collecting the pumpable flowing mixture in a hopper, wherein the hopper is attached to a hand-held sprayer. The further comprises applying a pigment to all or a portion of an outer surface of the coating. The method further comprises adding a high impact strength reinforced polymer resin to the dry ingredients, wherein the high impact strength reinforced polymer resin forms a semi-crystalline structure. The pumpable flowing mixture is applied to a horizontal surface or a somewhat horizontal surface. The pumpable flowing mixture is applied to a vertical or a somewhat vertical surface. The coating may have a compressive strength that is more than 7000 psi after a 28 day cure time. The coating may have a tensile strength of up to 1000 psi after a 28 day cure time.

A system for applying a flowable mixture to a surface is also described herein. The system comprises a dump hopper set at ground level for containing a flowable mixture. The system also comprises a pumping apparatus for moving the flowable mixture from the dump, wherein the pumping apparatus comprises a portable peristaltic positive displacement pump. The system also comprises a first portable hopper for receiving the flowable mixture from the pumping apparatus, the portably hopper further comprising a gate valve and level controller. The system also comprises a second portable hopper for receiving the flowable mixture from the first portable hopper. The system, when operating moves the flowable mixture in a horizontal direction up to about or at least about 300 feet away or moves the flowable mixture in a vertical direction up to about or at least about 75 feet high. The system may further comprise a hand held sprayer system in operable communication with the second portable hopper.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments will be explained in more detail with reference to the drawings in which.

DESCRIPTION

Figure 1:
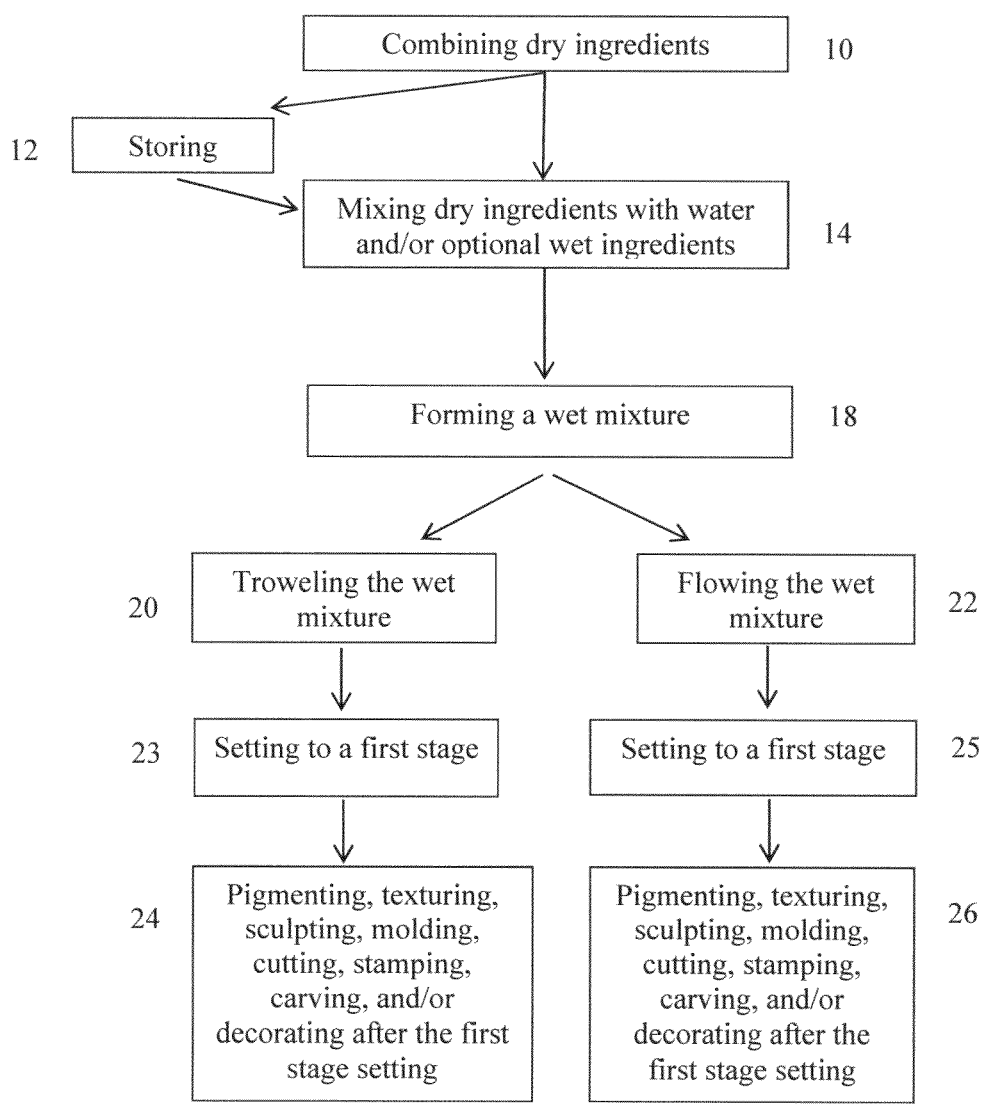
FIG. 1 depicts a process described herein.

Although making and using various embodiments are discussed in detail below, it should be appreciated that as described herein are provided many inventive concepts that may be embodied in a wide variety of contexts. Embodiments discussed herein are merely representative and do not limit the scope of the invention.

Described herein are formulations for providing a limestone masonry veneer composition. The formulations and compositions are prepared as described herein and applied to an interior surface (substrate) or an exterior surface (substrate). Prior to setting, the applied may be textured or otherwise altered in order to provide a new feature or appearance to the respective interior or exterior surface to which it was applied.

The limestone masonry veneer composition when fully cured is somewhat flexible due to the material itself, thereby allowing some movement with respect to the substrate to which it is applied, is vapor permeable (breathable), is weather and mold resistant, is less susceptible to cracks (unlike cement mortar veneer), and initially sets or forms to a first stage to allow surface carving or texturing of any kind for some time period prior to fully curing. The limestone masonry veneer composition may be applied to a surface or substrate by troweling or by a means for spraying, such as one provided by pumping and blowing using, for example, a spray device, such as a hand held spray device. The limestone masonry veneer composition may also be molded to any desired shape, initially setting shape at the first stage to allow surface texturing carving of any kind for some time period prior to fully curing.

In one or more embodiments, the limestone masonry veneer composition is formed from a formulation requiring a hydraulic binder. The hydraulic binder will at least include a natural hydraulic lime. This high pH hydraulic binder is hardenable and hardens (cures) under water or upon addition of water, and includes a sufficient amount of amorphous silica to form dicalcium silicate but does not generally form tricalcium silicate (or forms only very low amounts of tricalcium silicate) upon hydration. The natural hydraulic lime is prepared from natural limestone that contains calcium carbonate with an amount of silica (amorphous) together with small amount of alumina from clay, thereby naturally containing clay, in which the reacting silica (as an amorphous silica) together with alumina is preferably in an amount in the initial natural limestone that is about or less than about 15% of the initial limestone mineral. Natural hydraulic lime differs from high calcium hydrated lime, which is not hydraulic since it contains only crystalline silica, and also differs from so-called artificial hydraulic lime, in which hydraulicity is provided only upon the addition of one or more hydraulic additives. The hydraulicity of natural hydraulic lime is entirely from the limestone itself without requiring any additional materials (e.g., hydraulic and/or pozzolan additives) to the limestone during processing.

The natural limestone is generally prepared by decomposition during burning (calcining) and partially hydrating (slaking) to convert a specific amount of calcium oxide (quick lime) to calcium hydroxide, thereby providing a natural hydraulic lime (NHL) that meets the requirements as a natural hydraulic lime under grade NHL 2, or NHL 3.5 or NHL 5, as categorized by the European Norm EN 459 classification. The natural hydraulic lime described herein may in one or more embodiments have a grade of NHL 3.5 to NHL 5. The natural hydraulic lime has the following active components: calcium carbonate, calcium hydroxide, calcium oxide, dicalcium silicate, aluminum oxide and iron oxide. When prepared (calcined and partially hydrated), the natural hydraulic lime should have a pH of up to but not more than 12.4, will have a low sulfite content and should have a very low alkali content ($Na_2O$ and $K_2O$<1% or 2%), thereby minimizing any alkali silica reaction (ASR) or sulfur attack, such as when the natural hydraulic lime is hydrated with other components before setting, such as components that include less reactive silica or crystalline silica. The natural hydraulic lime when introduced in the formulation will be partially hydrated and be provided as a partially hydrated dry powder. The advantage of including a natural hydraulic lime is that it is a green mineral and it absorbs carbon dioxide from the air as it cures and hardens by carbonation, thereby advantageously allowing a longer total set time (which helps in part for the described compositions to be further sculpted, decorated and/or carved after an initial setting stage) as well as breathability to the composition when set (which helps in part for the described composition when fully cured to remain highly durable, without perceptibly cracking, and to undergo autogenous healing). This is contrasted with a cement-based mortar that cures in much less time, often in as little as four hours after being prepared, and often shrinks causing cracking after fully curing, making it difficult to texture and sculpt or to retain any textured features after curing. A typical cement-sand mixture has crystalline silica with low reactivity, forms as a low porosity material and is unable to expel free moisture or sufficient free moisture from the substrate when setting. In contrast, the carbonation provided with the natural hydraulic lime and the calcium carbonate limestone composition formed therefrom as described herein provides a high porosity during curing and to the final composition. Carbonation also allows the calcium carbonate limestone composition that forms from the formulations described herein to continue to breathe and expel excess moisture when curing and after curing. The highly alkaline pH of the natural hydraulic lime helps prevent the formation of mold, mildew and algae growth. Another advantage of the natural hydraulic lime is its ability to heal. Any small cracks are found to heal themselves by a means of autogenous healing (whereby moist hydrated lime draws in carbon dioxide, carbonating and almost doubling in mass as it forms calcium carbonate limestone). When the formulations described herein fully cure, the formed compositions, as calcium carbonate limestones still have a high pH, generally greater than 9.3, or up to about 9.7 (or greater) with a matrix that is greater than 90% calcium carbonate limestone, or greater than 91% calcium carbonate limestone, or 92% or more calcium carbonate limestone, or 93% or more calcium carbonate limestone, or 94% or more calcium carbonate limestone, or 95% or more calcium carbonate limestone, or up to 96% calcium carbonate limestone.

The advantage of the hydraulic binder described herein is that it includes at least the natural hydraulic lime with the advantages disclosed herein, including naturally having amorphous silica that is not found in alternative limes. Alternative limes contain crystalline silica, which is much less reactive. For this reason, mortars made from and that contain the alternative limes (those not described herein) must generally include the addition of a hydraulic binder (e.g., having dicalcium silicate and tricalcium silicate) in order to properly harden. However, the addition of these types of hydraulic binder are considered the source for decreased set time, descreased flexibility, increased shrinkage and, hence, increased surface cracking of the mortars that contain the alternative limes (those without natural hydraulicity). It is for this reason, as well, that one would not normally include a second hydraulic binder (one that has dicalcium silicate and tricalcium silicate) with the natural hydraulic lime described herein, because the natural hydraulic lime already contains amorphous silica, which is highly reactive, and any additional or second hydraulic binder would have been considered an accelerant, affecting set time, as well as hindering the carbonation and autogenous behaviors found with the natural hydraulic lime.

Another advantage of the hydraulic binder provided successfully with the described formulation is that its cure and hardening time is slower than a cement based mortar, thereby allowing sufficient time, up to about 8 hours, or up to about 12 hours, or greater than 12 hours, for the composition when formed to be textured or sculptured before the composition sets up and hardens. The hydraulic binder, which includes at least the natural hydraulic lime, is generally in an amount between about 1 wt. % and about 25 wt. % of the formulation based on the dry weight. In some embodiments, the hydraulic binder, which includes at least the natural hydraulic lime, is in an amount between about 5 wt. % and about 20 wt. % of the formulation based on the dry weight. In some embodiments, the hydraulic binder, which includes the natural hydraulic lime, is in an amount between about 10 wt. % and about 18 wt. % of the formulation based on the dry weight. In some embodiments, the hydraulic binder, which includes at least the natural hydraulic lime, is in an amount between about 12 wt. % and about 18 wt. % of the formulation based on the dry weight.

Generally, the hydraulic binder is not quick lime. The hydraulic binder is also generally not a hydrated lime, which hardens only by carbonation. While the carbonation reaction is desired for formulations described herein, it has unexpectedly been found that in one or more embodiments, the hydraulic binder may also include another type of binder that would not normally be considered when looking to prevent surface cracking or that would not normally be considered when desiring flexibility and decorative surfacing, such as texturing or carving in the manners described above, because these other types of binders, having dicalcium silicate and tricalcium silicate, are not hydraulic lime binders, and may instead include calcium silicate hydrate forming binders, calcium aluminum hydrate forming binders, alkali-activated binders and/or pozzolan binders. These other types of hydraulic binders typically have higher alkali content and undergo calcium silicate hydrate reaction and/or calcium aluminum hydrate reaction that provides a more irregular matrix comprising layers of silicate containing sheets that are more susceptible to destruction from water and undergo shrinking leading to more severe fractures, showing perceptible cracks under stress and/or with movement. These alternative type or calcium silicate hydrate forming binders are also not considered breathable materials, their porosity is less predictable as compared with natural hydraulic lime, they have a lower pH, are less flexible, and they do not autogenously heal. It was expected that addition of such binders would facilitate fracture formation and cracking by increasing density while reducing bending strength (flexibility) of the composition when formed. Such binders were also expected to significantly reduce cure time. Unexpectedly, it has been found that such binders when provided in specific quantities suprisingly appeared to reverse the expected effects that would normally be associated with hydration of such cementitious binders. For example, addition of one or more of such binders did not significantly increase fractures or cracking, or reduce bending strength or reduce set time when provided in the suprising combination with or in exchange for a portion of the natural hydraulic lime. Without being bound by theory, it is believed that when such a binder is combined with the natural hydraulic lime, said binder advantageously acts as a reactant, limiting many of the otherwise expected deleterious effects, yet offering strength (e.g., adding a high ultimate strength, as tensile and compressive strength) to the final composition without significantly reducing the calcium carbonate limestone that forms. Accordingly, in some embodiments, such binders may be provided in exchange for at least a portion of the natural hydraulic lime, thereby providing cost savings. In one or more embodiments, such binders may be used in exchange for and/or may replace up to 60% of the natural hydraulic lime content, while still providing a breathable, slow curing, autogenously healing composition that may be manipulated in any manner described herein and when formed as the described limestone based masonry veneer still comprises greater than 90% calcium carbonate limestone, or greater than 91% calcium carbonate limestone, or greater than 92% calcium carbonate limestone. When this additional hydraulic binder is included (in addition to the natural hydraulic lime), it is generally in an amount that is less than 12 wt. % based on the dry weight. It may be in an amount that is between about 1 wt. % and 12 wt. % based on the dry weight.

The hydraulic binder described herein, which will include at least the natural hydraulic lime, is blended in dry form with an aggregate or filler. The aggregate or filler is alkaline with a pH up to 9.3 and is a ground (dry) aggregate having particles sized by passing through a mesh that is preferably a Number 6 mesh screen (~3.36 mm) or a Number 40 mesh screen (~0.4 mm) or somewhere there between, thus of a particular mesh screen that provides particles of about 420 micrometer (~0.4 mm) or about 3360 micrometer (~3.36 mm), respectively, or having a particle size distribution somewhere there between. The alkaline aggregate is from a natural source. In one or more embodiments, the aggregate is calcareous, such as limestone, shale, chalk or marble. Thus, the aggregate is preferably another variant or source of calcium carbonate. This is in contrast with alternative cement-lime-sand mortars prepared with a calcined lime source and not with another variant or high source of calcium carbonate but with a crystalline siliceous aggregate, such as sand or clay. This is also contrasted with alternative lime-cement mortars made with lime putty (non-hydraulic lime) and a siliceous aggregate, such as sand, quartz, granite or silicon dioxide. The aggregate described herein is also in an amount that differs from other alternative lime mortars. The aggregate described herein is generally in an amount between about 45 wt. % and about 95 wt. % of the formulation based on the dry weight. In some embodiments, the aggregate is in an amount between about 50 wt. % and about 90 wt. % of the formulation based on the dry weight. In some embodiments, the aggregate is in an amount between about 60 wt. % and about 90 wt. % of the formulation based on the dry weight. In some embodiments, the aggregate is in an amount between about 65 wt. % and about 95 wt. % of the formulation based on the dry weight. Unexpectedly, it has been found that the particles of the aggregate may be sufficiently coarser than described above without greatly affecting the final formed composition in terms of its ability to be further carved, designed and/or decorated, breath, undergo carbonation, and form the final and desired calcium carbonate limestone. Coarser aggregate will provide a more coarse exterior surface (e.g., more granular) to the final composition when applied to the substrate and when fully cured. Similarly, the aggregate particles may be sufficiently smaller than the sizes described above without greatly affecting the final formed composition. Less coarse aggregate will provide a more slick exterior surface when applied to the substrate and when fully cured.

The highly alkaline nature (12.4 pH) of the partially hydrated natural limestone powder that forms the natural hydraulic lime (as NHL 2, or NHL 3.5 or NHL 5) and when combined with the alkaline and calcareous aggregate described above provides an extremely alkaline formulation that, when applied to a surface is still very reactive and ensures improved mold and mildew resistance, as compared with alternative lime-cement mortars that are typically produced with a neutral pH siliceous aggregate, such as sand or clay. Unlike alternative compositions, the described limestone based masonry veneer described herein does not require any artificial or synthetic binding resins or polymers, for binding. Similarly, in some embodiments, to form the described limestone based masonry veneer, additives are not required in order to prepare a breathable, slow curing, autogenously healing composition that may be manipulated in any manner described herein and after curing comprises greater than 90% calcium carbonate limestone, or greater than 91% calcium carbonate limestone, or greater than 92% calcium carbonate limestone, or greater than 93% calcium carbonate limestone, or greater than 94% calcium carbonate limestone, or greater than 95% calcium carbonate limestone.

As previously described, in some embodiments, the hydraulic binder and aggregate are optionally blended with the reactant. The reactant may be a pozzolan, which may adjust set time and/or increase workability. The reactant is in some embodiments preferably a calcium silicate hydrate forming material (e.g., containing siliceous and aluminous materials, such as a cementious binder material or white cement) that has a reactive surface available for a high pH calcium hydroxide (lime) reaction. The reactant may also or in addition be a pozzolan having a vitreous (glassy or amorphous, non-crystalline) phase, such as is found in silica glass (in bottles or windows), fly ash (class C or class F), volcanic ash, rice hull ash, blast furnace slag, and silica fume, and water glass (sodium silicate) as examples. For example, fly ash may be used in combination or to replace the calcium silicate forming material. Fly ash serves as suitable replacement when less brittleness is desired. The reactant may also be an alumina silicate clay, in which the silicate is amorphous, non-crystalline. The reactant is generally finely divided having a mean particle size of about 20 μm or less, or may be less than about 15 μm, or less than about 10 μm. The reactant may be in an amount between about 1 wt. % and about 25 wt. % of the formulation based on the dry weight. In some embodiments, the reactant is in an amount between about 2 wt. % and about 20 wt. % of the formulation based on the dry weight. In some embodiments, the reactant is in an amount between about 1 wt. % and about 15 wt. % of the formulation based on the dry weight. In some embodiments, the reactant is in an amount between about 1 wt. % and about 11 wt. % of the formulation based on the dry weight. In some embodiments, the reactant is in an amount between about 2 wt. % and about 12 wt. % of the formulation based on the dry weight. When the reactant is used in combination with natural hydraulic lime, the ratio of reactant to natural hydraulic lime may be 1:2.5 to 2.5:1. For example, a formulation described herein may include up to about 12 wt. % natural hydraulic lime based on the dry weight and up to about 4 or 5 wt. % reactant based on the dry weight in addition to the aggregate with or without other additives. Or, a formulation described herein may include up to about 4 or 5 wt. % natural hydraulic lime based on the dry weight and up to about 12 wt. % reactant based on the dry weight in addition to the aggregate with or without other additives. Or, the formulation may include any range therebetween of the natural hydraulic lime and the reactant in addition to the aggregate with or without other additives. When the formulation comprises a hydraulic binder in the form of up to about 12 wt. % natural hydraulic lime based on the dry weight and up to about 4 or 5 wt. % reactant based on the dry weight, the limestone based masonry veneer when formed may contain about 95% or 96% calcium carbonate limestone. Unexpectedly, when the formulation comprises a hydraulic binder in the form of up to about 4 or 5 wt. % natural hydraulic lime based on the dry weight and up to about 12 wt. % reactant based on the dry weight, the limestone based masonry veneer when formed will still contain about 92% or up to about 92% calcium carbonate limestone.

To the hydraulic binder, aggregate or filler, and optional binder reactant, additional components or additives may be included. Many of said additives would not be expected to provide beneficial effects to the limestone based masonry veneer described herein. It is believed that the additives described herein, while used in alternative industries, such as the paper industry or cement industry or gypsum industry, would not generally have been considered as additives when preparing a mortar, and more importantly, would not have been considered when preparing the veneer of the type described herein. The additives described are not considered common knowledge to those in the mortar industry. One or more additives as described may be introduced prior to, during or after the addition of water. The additives include but are not limited to a surfactant, air entrainment agent, accelerant, retardant, bonding agent, cellulose, water reduction agent, strength enhancer, plasticity modifier, and polymer as an additive for horizontal applications. In some embodiments, the additive may also include a natural or synthetic pigment.

A suitable surfactant or surface modifier is an organic chemical, namely triethanolamine (TEA). This is generally added as a liquid with or after water is introduced to the dry ingredients. When included, it is in an amount that is between about 0.01% to about 0.05% based on the dry weight. In some embodiments it will be in an amount of up to about 0.1% based on the dry weight. This additive aids penetration and adhesion of the mixture into the substrate. The additive will also increase particle dispersion when particles are unevenly sized.

A suitable air entrainment agent is a soapy additive or latex-based wet additive, such as represented by the Silipon air-entraining agents from Ashland, Inc., or may be an anionic surfactant, such as represented by Igepon, a family of fatty acid amide surfactants. These agents assist in the production of uniform air bubbles during application, and allow the composition when setting to increase its water holding capacity while decreasing its overall density. These agents also improve lubricity, plasticity and workability of the composition so that it may be easily textured prior to setting. Plasticizers that increase flowability of the formulation when wetted, particularly when used at higher viscosities may also be included.

Retardants and/or accelerants may be included, generally added to the mixer after water is introduced. These additives will adjust set time of the composition, and are most often included with adverse changes in weather conditions. Examples of retardants are, but are not limited to, lignin sulfonate, gypsum powder, sodium citrate or sucrose. Examples of accelerants are, but are not limited to, calcium chloride, potassium sulfate or calcium formate. In one or more embodiments it may be preferred to include calcium chloride when an accelerant is needed, as this will also increase strength of the composition when set. In addition or as an alternative, sodium chloride may be included as an accelerant, such as in cold or inclement weather conditions that normally prolong the reaction further. In an embodiment, the amount of the retardant or accelerant will not be more than 1.5% by weight of the final composition.

A bonding agent will be included to improve bonding or adhesion of the composition when applied to the surface. Suitable bonding agents include but are not limited to polyvinyl acetate, polyvinyl alcohols, acrylic resins, butadienes, various polymer resins, TEA and cellulose derivatives.

A suitable water resistance agent is an alkaline earth stearate, such as calcium stearate. This product not only assists in resisting water penetration into the composition, it also acts as a lubricant to improve flow of the composition when flowing through a sprayer or pump. It will be effective in inclement weather. Additionally, it improves the shelf life of the dry ingredients when the dry ingredients are blended but not used immediately. The calcium stearate when used is added in an amount that is between about 0.1 to about 5% of the weight of the dry ingredients. In some embodiments, calcium stearate will be about 0.2% of the weight of the dry ingredients.

A water reducer, such as calcium or lignin sulfonate is unexpectedly suitable to prevent sulfate attack, such as in moist environments (e.g., near water or certain soil). This additive, which would normally increase density and reduce porosity of the composition when formed, may, however, be desirable in the environmental conditions described.

Suitable compressive and tensile strength enhancers are cellulose fibers, horse hair and/or plastic fibers. Cellulose fibers are long fibers provided by the Kraft process that are typically delignified and fiberized. The fibers may be added dry (e.g., hammer milled from fiber or strong Kraft paper stock) and provided with the dry ingredients. Cellulose fibers while used to increase tensile strength of the final composition; they unexpectedly can be added to increase impact resistant, reduce surface cracking and prevent chipping. The amount of cellulose fibers will be up to about 0.5 wt. %, or 1 wt. % or 2 wt. % of the total dry weight. An additional strength enhancer, which may increase impact resistance is boric acid. Water glass, a liquid amorphous silica may be included in small amounts to increase tensile strength, flexibility and crack resistance. Additional high impact strength additives include high impact strength reinforced thermoplastic resins, including ones that allow intermittent, periodic, or frequent loading of up to 300 lbs. or more, such as but not limited to polyester or nylon or polyvinylchloride, or polyimide and the like. These polymers have a larger molecular mass and form a semi-crystalline structure when hardened.

Should safety or fire retardance be desired, fiberglass may be included to enhance fire resistance, or will allow said materials when formed to achieve a suitable Fire Code rating. Additives, when included in any of the formulations described herein do not generally make up more than 20 wt. % of the formulation based on the dry weight. Often, the additives are in an amount that is up to about 5 wt. % of the formulation, or up to about 4 wt. % of the formulation, or up to about 3 wt. % of the formulation or less based on the dry weight.

In one or more formulations described herein calcium silicate hydrate and calcium aluminate hydrate in addition to the calcium carbonate limestone will be formed when the coating composition is fully hardened. The alkaline aggregate, preferably limestone, having a pH of about 9.3, which is specifically screened and sized first, ensures that the coating composition resists mold and is hydrophobic or water resistant. Additional additives can include a surfactant to facilitate good penetration of the coating into the surface to which it is to be applied (which is typically a somewhat porous substrate, such as an exterior or interior wall, concrete, rock or brick); an air entraining agent to add lubricity, better water holding capacity and adjust density; cellulose fibers or the like to increase impact resistance; and/or water reducer. A combination of the alkalinity of the aggregate, such as the highly alkaline limestone, along with a surfactant additive provides especially improved weather resistance in the implementations described herein. Similarly, a combination of the alkalinity of the aggregate, such as the highly alkaline limestone, along with the air entraining agent provides a synergistic combination for improved weather resistance of the formulation as applied to surfaces, particularly to outdoor surfaces. A combination of the air entraining agent when provided along with compositions in which the hydraulic lime binder is combined and replaced in part by one of the alternative or more cementitious type binders provides a synergistic combination for improved porosity of the composition when applied. A combination of the described amounts of cellulose fibers or the like with the described aggregate, such as the highly alkaline limestone, is particularly advantageous given the characteristics of the limestone or other aggregates described herein.

A retarder or accelerant may be added to control and adjust the set time in order to accommodate less than optimal weather conditions. These additives are generally added while the mixture is being prepared and agitated in the mixer.

The described formulations are suitable for use as a flowing masonry veneer mixture, which is a composition that may be pressure sprayed (blown), troweled or otherwise applied to a surface. The applied coating(s) may be of any thickness. Some suitable thicknesses are between about ½ inch to 1 inch or can be between about ⅜ to about 1½ inches. It is understood that thicker or thinner coatings may also be applied, as desired. After an initial set time of about 1 hour, the coating composition can be textured, sculptured, carved and/or decorated (with or without surface pigmenting) for up to 12 hours leaving a beautiful or any desired textured, sculptured, carved and/or decorated feature to the surface that will remain for many decades without degrading. In some embodiments, the formulation will include a pigment prior to being added to the substrate surface to which it is to be applied.

To prepare the described limestone masonry veneer composition, generally the dry components of the formulation are initially added together and blended, as depicted in box 10, FIG. 1. These dry components will at least include the hydraulic binder, which has the natural hydraulic lime, the aggregate, optionally a reactant and/or one or more additives. Pigment may also be added before or after mixing. These dry components are initially blended and may then be stored for some time prior to adding water, as depicted in box 12, FIG. 1. With addition of water, either immediately after blending the dry components, or sometime after blending the dry components, the composition is further blended, as depicted in box 14, FIG. 1. Blending may include any means of blending, which may include a dry blending means, such as a pug mill or a wet blending means, such as a mixer having a paddle or large blades. Another blender or mixer may be used as long as the blender or means of blending does not mill or further grind the components and particles, but allows the components to blend well, forming a wet or moistened mixture, as depicted in FIG. 1, box 18. The wet or moistened mixture will be a viscous slurry, it will be suitable as a pumpable or flowing mixture having a solids content of about or greater than about 40%, or about or greater than about 50%, or greater than 60%, or about or greater than about 70%, or up to about 95%. The solids content described herein is a higher solids content than a typical slurry that has a solids content of only up to about 30%. In some embodiments, the solids content is between about 40 wt. % and 65 wt. %. In some embodiments, the solids content is greater than 45 wt. % and up to about 95 wt. %. In some embodiments, the solids content is between about 60 wt. % and up to about 90 wt. %. When formed as the flowing mixture, it may be applied to a surface by troweling, as depicted in FIG. 1, box 20, or by flowing (box 22, FIG. 1), such as through a pump system as described further below. In other embodiment, the flowing mixture may be cast or molded into a shaped article to form said shaped article when cured. After the wet or moistened mixture is cast, molded, or is applied by troweling or by blowing onto a substrate surface, it may be further manipulated by pigmenting, texturing, sculpting, cutting, carving, and/or decorating, as depicted in FIG. 1, boxes 24 and 26. The decorating, pigmenting, texturing, sculpting, cutting or/or carving may occur shortly thereafter, such as after disposing on the substrate or after casting or molding and allowing the limestone masonry veneer composition to set to a first stage, as depicted in FIG. 1, boxes 23 and 25. The first stage may be up to about 1 hour or may be some hours after. Generally, the manipulations described in boxes 24 and 26 occur during a second stage, which is generally up to about 24 hours after applying or disposing on the substrate or after casting or molding, or it may be up to about 12 hours after applying or disposing on the substrate or after casting or molding. Generally, the limestone masonry veneer composition once cast, molded or otherwise applied is allowed to stiffen or set to the first stage for about an hour or for at least an hour before any texturing, sculpting, cutting and/or carving is begun. In some embodiments, a pigment or a plurality of pigments may be applied after texturing, sculpting, cutting, and/or carving. In some embodiments, a pigment or a plurality of pigments may be applied before texturing, sculpting, cutting, carving and/or otherwise decorating, thereby providing a pigmented surface that is then further manipulated by texturing, sculpting, carving, or decorating. It is also understood that the wet or moistened mixture may be pigmented prior to applying to a surface, such as when combining the dry ingredients (box 10, FIG. 1) or when forming the wet mixture (box 18, FIG. 1) or shortly after forming the wet mixture. In some embodiments, cutting or carving may include applying a stamp or other cutting element to at least a part of the limestone masonry veneer composition to further shape said surface or to provide some depth to at least a portion of the limestone masonry veneer composition. One or a plurality of layers (e.g., in the same or varying depths or thicknesses, and generally provided in series) may be applied to any one substrate or to at least a portion of any one substrate.

Figure 2:
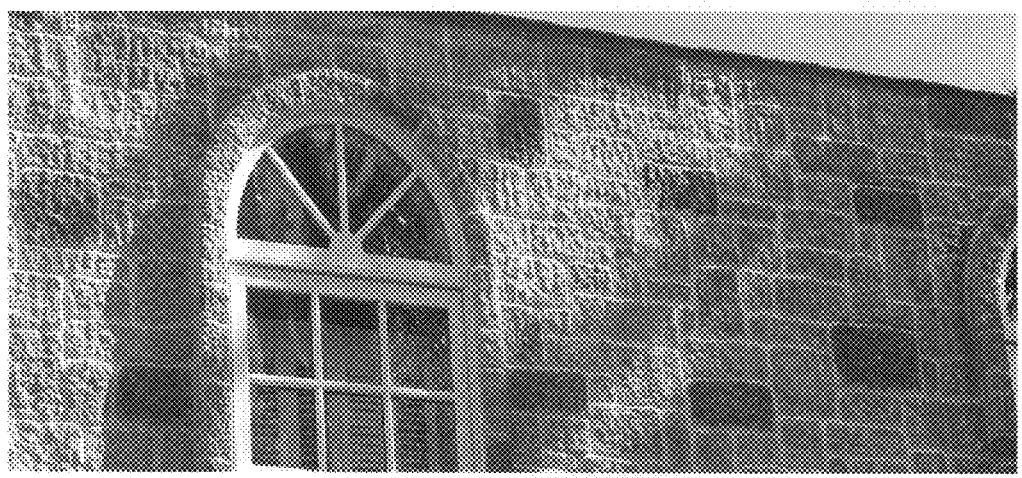
FIG. 2 depicts a textured surface of the type formed by a composition and process described herein.
Figure 3:
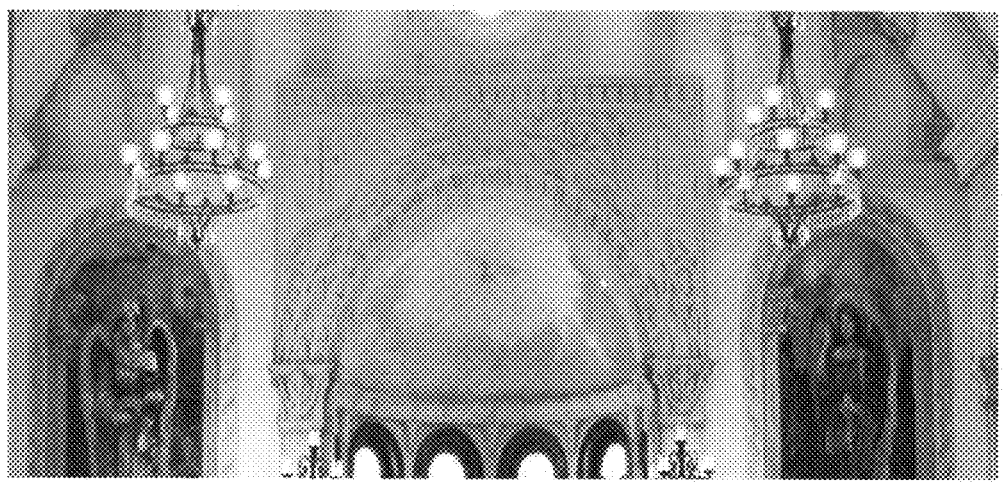
FIG. 3 depicts another a textured surface of the type formed by a composition and process described herein.
Figure 4:
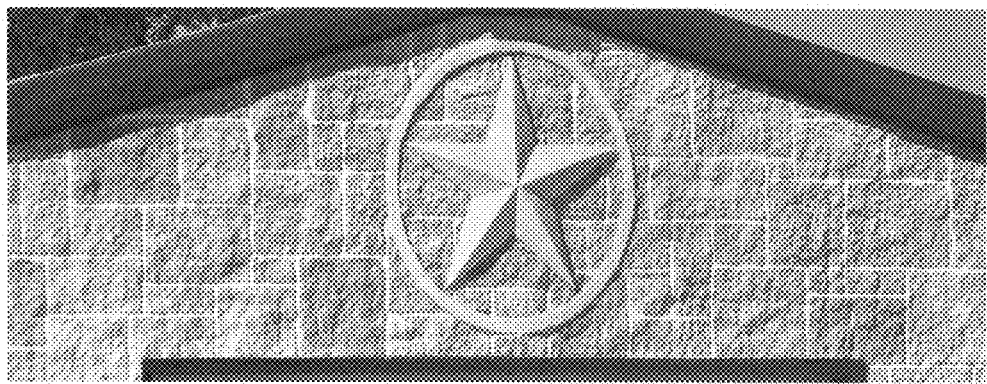
FIG. 4 depicts still a textured surface of the type formed by a composition and process described herein.
Figure 5:
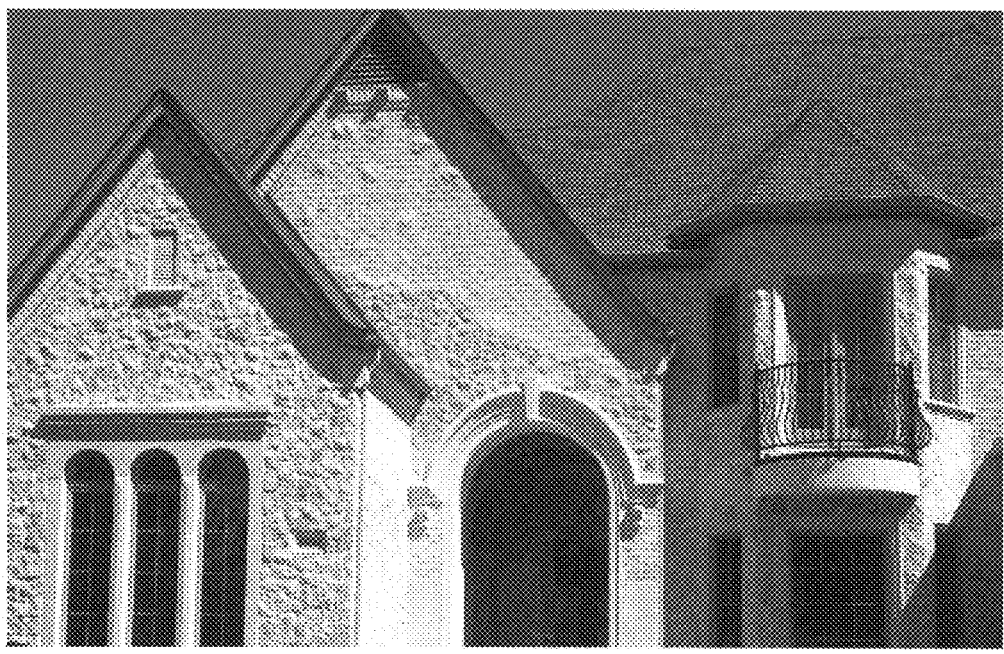
FIG. 5 depicts yet another textured surface of the type formed by a composition and process described herein.
Figure 6:
FIG. 6 depicts a further textured surface of the type formed by a composition and process described herein.

Examples of limestone masonry veneer coating compositions that were applied to various surfaces by the methods described herein and were then textured, sculpted, carved, and/or decorated are depicted in FIGS. 2 to 6. FIG. 2 illustrates a limestone masonry veneer coating composition described herein that was applied to an exterior surface of a building and was pigmented and textured prior to setting. FIG. 3 illustrates a limestone masonry veneer composition described herein that was applied to an interior surface of a building and was then pigmented and textured prior to setting. FIGS. 4 and 5 illustrate a first limestone masonry veneer coating composition that was applied to an exterior surface of a building and was pigmented and textured prior to setting, followed by the application of a second limestone masonry veneer coating composition to a portion of the exterior surface of the first limestone masonry veneer composition after the first limestone masonry veneer coating composition was at least partially set, in which the second limestone masonry veneer composition was then pigmented and textured as shown. FIG. 6 illustrates a limestone masonry veneer coating composition described herein that was applied to an outer surface of a wall and was then pigmented and textured prior to setting.

Representative limestone masonry veneer coating compositions to apply to any of the substrates or surfaces, such as disclosed in FIGS. 2 to 6, will include (in dry weight) up to 16 wt. % of a hydraulic binder based on the dry weight, which includes at least the natural hydraulic lime (NHL grade 3.5 or 5). The composition is not rapid setting, and instead, includes a delayed setting, thereby allowing texturing, sculpting, and/or decorating about one hour after applying and up to about twelve hours or more after applying to an interior or exterior surface. The limestone masonry veneer coating composition of FIGS. 2 to 6 included (in dry weight) about 9-11 wt. % natural hydraulic lime (NHL 3.5), 3-5 wt. % cementitious hydraulic binder, in addition to the aggregate, in which the aggregate was the primary remaining component, the aggregate preferably being crushed natural limestone with particles screened using between a 6 mesh screen and 40 mesh screen with or without one or more additives. The dry ingredients were dry blended without further crushing or grinding and slurried with 1.5 gal water for 1.5 cubic feet of dry ingredients.

The method of applying the limestone masonry veneer coating compositions depicted in FIGS. 2-5 included the following: preparing by clearing the surface to which the limestone masonry veneer coating composition was to be applied, mixing the powder or dry ingredients of the composition in a mixer; adding water to the powder or dry ingredients to form a pumpable and flowing mixture, in which the pumpable mixture included about 1.5 gallons of water per 1 cubic feet of dry ingredients, collecting the pumpable mixture in a hopper, wherein the hopper was attached to a hand-held sprayer; spraying the flowing mixture through the sprayer onto the surface to a desired thickness, such as ⅜ inch, ½ inch, ¾ inch, or 1 inch, as examples, to provide the masonry veneer coating; applying pigment to the exterior of the coating after spraying; allowing the pigmented coating to harden for at least about one hour; carving and/or cutting decoratively using a special decorative tool, or carving tool, and/or shaped cutter, wherein the carving and/or cutting created a desired look, including grout lines; brushing the entire surface after cutting and/or carving to clean; and allowing the now decorative coating to set, wherein the now decorative coating continues to harden until fully cured. The step of initially mixing the dry ingredients in the mixer may be eliminated in some embodiments, in which the dry ingredients for forming limestone masonry veneer coating compositions are pre-blended in advance. As an example, the dry ingredients may some time prior to use be dry blended without crushing or grinding and stored in bags, such as a 66 lb. bag. The pre-blended bag is then readily hydrated on site by adding a suitable amount of water, such as 1.0 gal., 1.5 gal. or 2.0 gal. of water, to form the pumpable and flowing mixture. In addition, the step of applying the pumpable and flowing mixture to the surface and/or carving and/or cutting decoratively said coating after applying it and may be repeated one or a number of times. It has been found unexpectedly (and unlike blown stucco or cement-based coatings) that there is suprisingly high bonding between a first layer as described herein and a second or subsequent layer as described herein when applied thereafter to the first layer. The second or subsequent layer may be further carved and/or cut and/or pigmented as desired and does not interfere with the breathability and flexibility of the first layer nor does there appear to be a seam line (e.g., a fracture line) between the first and subsequent layer formed on some or all of the first layer. Instead, the second or subsequent layer where applied provides a new exterior surface for cutting and/or carving as is desired and is well bonded with the first layer when applied therein, forming what appears as continuous calcium carbonate upon curing.

Setting of the blended coating composition is not rapid, as it is with a cement mortar or stucco veneer. In fact, with the described limestone masonry veneer coating composition, it may be applied to a surface and textured, sculpted, carved or decorated for up to about 12 or more hours after application, or up to 18 hours or up to 24 hours after application, in order to create a textured, sculpted, carved or decorated look to the exterior of the surface to which it was applied. While an initial set or stiffening will occur in about one hour, the described limestone masonry veneer composition is capable of being textured, sculpted, carved or decorated for up to about 12 or more hours thereafter. The workability of the limestone masonry veneer coating composition described herein is excellent. The coating composition does not significantly harden for about 24 hours. Thus, unlike rapidly setting Portland cement based compositions, such as those forming concrete or based primarily on Portland cement or similar type hydraulic binder as the primary source for hydraulicity, the limestone veneer composition described herein offers an open field time after the initial setting or stiffening for texturing, sculpting, and/or decorating, allowing the field or work time to begin as early as one hour after applying and up to about twelve hours or more after applying the compositions described herein to the interior or exterior surface. The composition will then continue to harden (e.g., for months and years) due to carbonation. In some embodiments, the described composition will achieve an ultimate compressive strength of up to about 1100 psi or up to about 500 psi in 28 days. In some embodiments, the described composition will achieve an ultimate compressive strength of up to about 1800 or 2000 psi after a 28 day cure time. In some embodiments, the described composition will achieve a tensile strength of up to about 1000 psi or 7 MPa after a 28 day cure time. Unexpectedly, the values were not significantly affected when replacing up to 60% of the natural hydraulic lime with an alternative hydraulic binder, such as a calcium silicate hydrate forming binder. The achieved compressive and tensile strength values may be modified as desired by making adjustments, such as to the amount of reactant, and/or ratio of hydraulic binder and reactant, beyond the amounts described herein. Mold does not accumulate behind the limestone veneer coating composition described herein when fully cured due to the alkalinity (9.3 pH) of the aggregate described herein, such as the finely divided limestone aggregate or filler.

The final limestone masonry veneer coating composition when hardened will generally have at least or greater than 90% calcium carbonate limestone, which resists salt water and acid rain, as examples. In some embodiments, the final limestone masonry veneer coating composition when hardened and cured will have about 95% pure calcium carbonate limestone. This contrasts with natural mined limestone that is generally only about 85% pure calcium carbonate or may be between 85% and 94% pure calcium carbonate. Air carbonation (drawing carbon dioxide from the surrounding air) allows the limestone masonry veneer coating composition described herein to further cure, which converts the composition to a predominantly calcium carbonate limestone material when fully cured. Thus, the limestone masonry veneer coating composition described herein is predominantly calcium carbonate or limestone. The high alkalinity of the final limestone masonry veneer coating composition is influential in providing an improvement for preventing mold and mildew growth improved workability and enhanced aesthetic characteristics. Air carbonation allows the limestone masonry veneer composition to form a new composition comprising predominantly highly pure calcium carbonate, forming limestone when fully cured. The ambient air process of absorbing carbon dioxide increases the strength of the veneer, allowing autogenous healing and increasing unit weight, which provides a high compressive strength for a durable, lasting finish.

In some embodiments, the limestone masonry veneer composition when prepared can be scaled up or scaled down. Formulations for preparing the limestone masonry veneer compositions described herein may be prepared in batches. A useful batch may include 1.5 gallons of water per 1 cubic foot of dry ingredients. Another useful batch may include 2 gallons of water per 1.5 cubic feet of dry ingredients. Another useful batch may include 1.5 gallons of water per 1.5 cubic feet of dry ingredients. Other variations may be made and in smaller or larger quantities in order to accommodate the required surface or substrate. The amount necessary can be quantified by knowing the dimensions of the surface and the desired thickness that will be applied. In some instances, more than one layer of the limestone masonry veneer coating composition described herein may be applied to the same surface in order to modify appearance.

The limestone masonry veneer coating compositions described herein are suitable for spraying using a pressurized hose and a suitably configured nozzle routinely used in the industry. It can also be applied by a trowel or other similar type of application tool. The air pressure for flowing or spraying the limestone masonry veneer composition is generally between about 105 psi to 125 psi. Of course, it is understood that other pressures may still be suitable, while not necessarily providing as optimal a rate of flow or coating thickness. An improved process for applying the described limestone masonry veneer coating compositions is described below.

Figure 7:
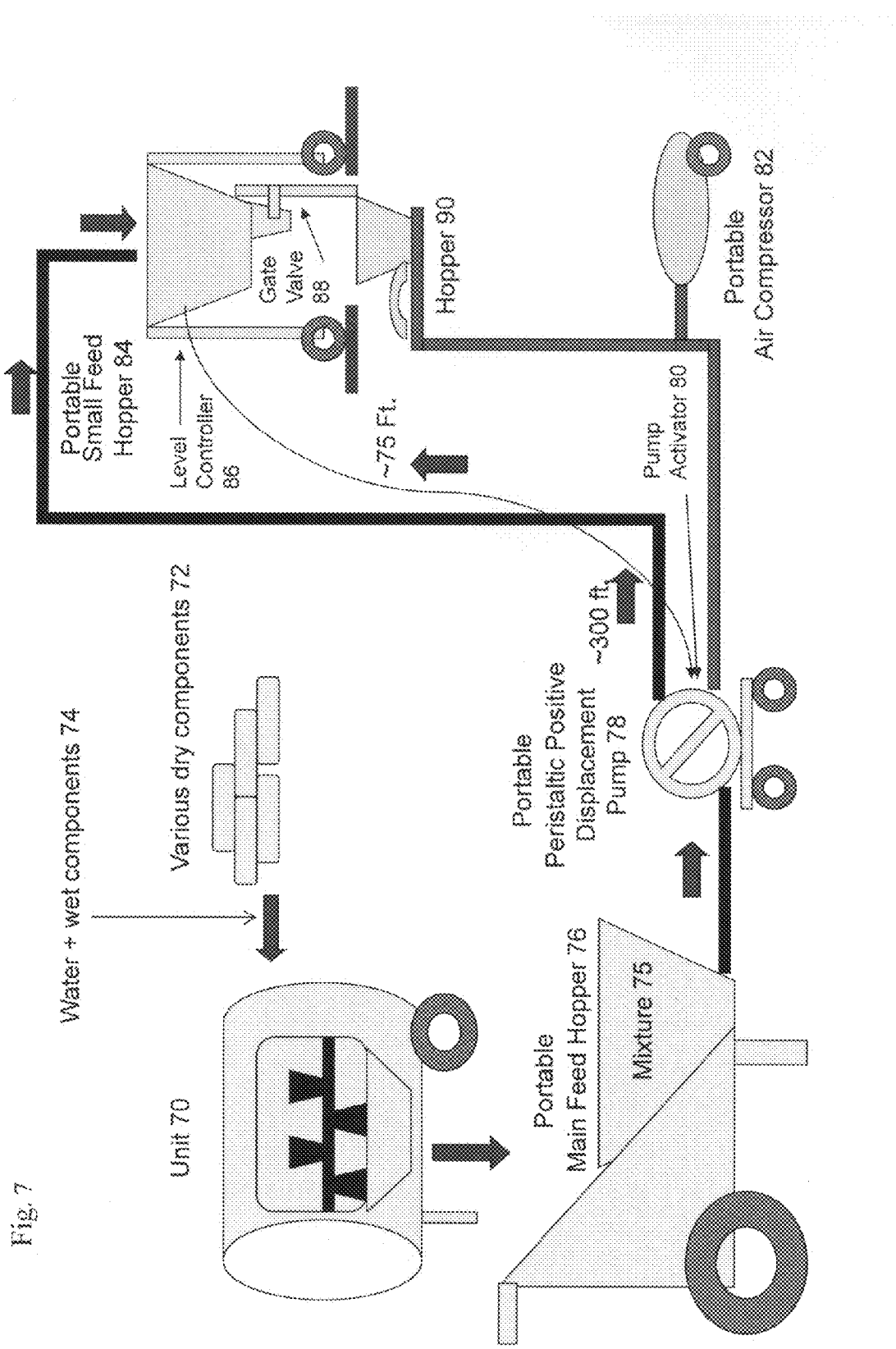
FIG. 7 depicts a yet another process as described herein.

Because the pumpable flowing mixture is more viscous than a typical slurry, it has been considered difficult to flow over a long distance, such that cumbersome and labor intensive wheel barrows or upward lifting buckets would be used. As described herein, a method that overcomes this previous difficulty is also described. This described method includes an improved feeder system, as generally depicted in FIG. 7, which allows the described masonry veneer composition to be blended or mixed in a mixing unit 70 located on the ground level and pumped from up to or about 300 feet away horizontally and/or is located on the ground level and pumped to a vertical height of up to about 75 feet. This is contrasted with alternative systems that are labor intensive and time consuming, in which wetted material or pumpable or flowing mixture 75 are dumped from the mixing unit 70 into a wheelbarrow (not shown) and the wheelbarrow is physically moved to the work site, which is often up to or greater than 300 feet away horizontally or up to or greater than 75 feet away vertically. The described system is also contrasted with systems that use a centrifugal pump because a centrifugal pump is not appropriate for application of the compositions described herein having the thickness or viscosity as described. Centrifugal pumps include blades on a rapidly moving rotor that will cavitate in the thick mix or shear and disintegrate particles in the mixture, which is not favorable or desired. Sheared smaller particles will form a gel-like material that is even more viscous and thicker than the described mixture; and such a gel-like viscous material is far too thick, forming a paste, that is not suitable for spraying, flowing or blowing on a surface by the usual methods or by the improved systems and methods described herein.

With the improved system, a standard mixing unit 70 can still be loaded to its standard capacity (e.g., equivalent to 5 bags of dry component 72 with about a gallon and a half of water and wet blended components 74, the dry component often at about 66 pounds per bag on a dry basis). A standard capacity is about is about 390, 392, or 400 lbs. The improved system is also fully compatible with a typical compressed air blower and standard small-hand held hopper-sprayer system and hose, in which the hose may be about 2 inches in diameter and the hose length is about three feet or more. For a standard system; however, the weight of the coating composition would provide a weight of about 58 lb. for the coating composition to move from the ground/wheelbarrow to an arm level of a worker who will be spraying the coating composition on a surface. Unfortunately, such an amount is too much weight for a straight line hose application traveling for any large amount of distance. Thus, without the improved system described herein, spraying will generally be performed with only a small-hand held hopper-sprayer system alone that is immediately adjacent the blending unit 70, or will require the pumpable flowing mixture to be moved some distance by a wheelbarrow to the worksite. A standard small-hand held hopper-sprayer system typically has a limited capacity of about 0.9 gallon and will weigh about 12 lbs. (including the material, spray gun and small hand held hopper). Thus, the standard system is a slow system and laborious for a worker applying one or more coatings on a surface, especially on a commercial scale.

The improved system described herein, which includes a power sprayer and hose, further comprises a dump hopper 76 set at ground level that is capable of holding the full capacity of flowing mixture 75 that is removed from a standard mixing unit 70 after blending all the ingredients of the coating composition described herein. A pump 78, which may be a portable peristaltic positive displacement pump, configured with a hose, such as a 2½ hose, moves the pumpable flowing mixture 75 from the hopper 76 to a smaller portable hopper 84. Hopper 84 is one that is capable of feeding about one gallon of masonry veneer mixture 75 via a gate valve 88 and level controller 86 to hand held hopper 90, such that the valve is activated when the lever controller is triggered (e.g., when one gallon of pumpable flowing mixture 75 is filled in hopper 84). Gate valve 88 allows flowing mixture 75 from hopper 84 to move to hopper 90. The feed hopper 84 is fed by a peristaltic pump action by a level switch. The pump 78 is capable of pumping the flowing mixture 75 from a 10 cubic foot capacity main hopper 76 to a smaller 7 gallon capacity hopper 84. The pump 78 is capable of pumping a flowing mixture 75 that is about or up to at least 300 feet away (in a horizontal direction) as well as about or up to at least about 75 feet high. The rate of pumping will be about 5 gallons per minute when the pump is activated. Thus, as described herein, is an improvement in which an initially large volume and weight of flowing mixture 75 is fed to a standard hand held hopper 90 that is configured with a standard spray gun and nozzle that typically weighs about 10 lbs. when it's one gallon hand held hopper 90 is full. A typical standard small-hand held hopper-sprayer system generally has a limited capacity of about 1 gallon (0.9 gallon) and will weigh about 12 lb. (including the material, spray gun and small hand held hopper).

The following TABLE provides an example of the improved system and method described, based on an estimate of a wet pumpable flowing mixture of the type described herein having a weight of 56.58 pounds per cubic feet or 7.56 pounds per gallon.

TABLE

| Unit 70 | to Hopper 76 | to Pump 78 | to Hopper 84 | to Hopper 90 | to Surface |
|---|---|---|---|---|---|
| 392 lb. | 392 lb. | 5 gal/min | 53 lb. | 10 lb. | 8 lb. |
| 8.5 cubic feet | 10 cubic feet | 5 gal/min | 7 gal | 0.9 gal | 0.9 gal |

This improved system allows remote mixing and pumping up to about 300 feet away horizontally and up to or about 75 feet away vertically. It is understood that any positive displacement pump such as peristaltic types, diaphragm types, and piston type pumps may be used for pump 78.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used or used to an advantage.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A masonry veneer formulation comprising:
   dry ingredients that include:
   a hydraulic binder in an amount between about 10 wt. % and about 16 wt. % based on a dry weight of the formulation, the hydraulic binder including at least a natural hydraulic lime of NHL grade 3.5; and
   an aggregate comprising natural limestone, the aggregate being initially screened with a mesh that is a number 6 mesh, a number 40 mesh or a mesh of a size there between, wherein the aggregate is in an amount between about 70 wt. % and about 90 wt. % based on the dry weight of the formulation and a reactant selected from the group consisting of a calcium silicate hydrate forming material, and a pozzolan, wherein the reactant is in an amount so that the ratio of reactant to natural hydraulic lime is between 1:2.5 to 2.5:1; and
   water in an amount to form a slurry having solids content when wet of between about 60 wt. % and about 90 wt. %.

2. The formulation of claim 1, wherein the formulation further comprises triethanolamine in an amount between about 0.01% and about 0.05% of based on the dry weight of the formulation.

3. The formulation of claim 1, wherein the formulation further comprises an accelerant or a retardant in an amount not more than 2% based on the dry weight of the formulation.

4. The formulation of claim 1, wherein the formulation further comprises calcium stearate or a water proofing binder in an amount between about 0.1% and about 5 wt. % based on the dry weight of the formulation.

5. The formulation of claim 1, wherein the formulation further comprises hammer milled cellulose fibers in an amount up to about 2 wt. % based on the dry weight of the formulation.

6. The formulation of claim 1, wherein the formulation further comprises additives that make up no more than 20 wt. % based on the dry weight of the formulation.

7. The formulation of claim 1, wherein the formulation when wet has a solids content of between about 65 wt. % and about 90 wt. %.

8. The formulation of claim 1, wherein the cementitious binder is in an amount between about 8 wt. % and about 12 wt. % based on the dry weight of the formulation.

9. The formulation of claim 1, wherein the formulation when cured provides a coating having a calcium carbonate limestone content of at least or greater than 92%.

10. A masonry veneer coating composition comprising:
    a natural hydraulic lime of NHL grade 3.5; and
    a natural limestone being finely divided with a mesh that is a number 6 mesh, a number 40 mesh or a mesh of a size there between; and
    a reactant selected from the group consisting of a calcium silicate hydrate forming material and a pozzolan; and a bonding agent selected from the group consisting of polyvinyl acetate and polyvinyl alcohols, wherein the bonding agent is in an amount up to about 5 wt. % based on a dry weight; and water in an amount to form a slurry having solids content when wet of between about 60 wt. % and about 90 wt. %; and the natural hydraulic lime comprising not more than 18 wt. % based on the dry weight, the coating composition being capable of stiffening in about 1 hour, such that the stiffened surface of the coating composition allows application of a decorative tool or carving tool to the stiffened surface within about 1 hour after depositing the coating composition at a thickness of between about 0.5 inches and about 1.5 inches, the coating composition taking up to about 24 hours to fully set, and the coating composition when fully formed having a calcium carbonate limestone content of at least 92%.

11. A method of applying a coating composition comprising:

blending the coating composition of claim 10 in a mixing unit thereby forming a flowing mixture;

transferring the flowing mixture to a first hopper, wherein the first hopper is up to about 300 feet away from a work site or up to about 75 feet below the work site; and using a peristaltic pump to move the flowing mixture from the first hopper to at least a second hopper, wherein the peristaltic pump moves the flowing mixture at a rate of about 5 gallons per minute, and wherein the second hopper is configured to feed about 1 gallon of flowing mixture to a third hopper, wherein feed of the flowing mixture to the third hopper is operable with a gate valve and a level controller so configured to allow flow of the flowing mixture from the third hopper to a hand held apparatus.

12. A method of applying a coating composition comprising:

blending the coating composition of claim 10 in a mixing unit thereby forming a pumpable flowing mixture, wherein the pumpable flowing mixture has a solids content greater than about 45%;

applying the pumpable flowing mixture onto an exterior or interior surface, wherein applying includes blowing the pumpable flowing-mixture to a thickness on the surface of between about 3/8 inches thick to about 2 inches thick, thereby providing a coating on the exterior or interior surface;

allowing the coating to set for at least about one hour;

using a decorative tool or carving tool to create grout lines in the coating;

cleaning the coating with a brush; and allowing the coating to fully cure.

13. The method of claim 12, wherein applying includes collecting the pumpable flowing mixture in a hopper, wherein the hopper is attached to a hand-held sprayer.

14. The method of claim 12, further comprising applying a pigment to all or a portion of an outer surface of the coating.

15. The method of claim 12, further comprising adding a high impact strength reinforced polymer resin to dry ingredients, wherein the high impact strength reinforced polymer resin forms a semi-crystalline structure.

16. The method of claim 12, wherein the pumpable flowing mixture is applied to a horizontal surface.

17. The method of claim 12, wherein the pumpable flowing mixture is applied to a vertical surface.

18. The method of claim 12, wherein the coating has a compressive strength that is up to 1800 psi after a 28 day cure time.

19. The method of claim 12, wherein the coating has a tensile strength of up to 1000 psi after a 28 day cure time.

20. A dry masonry veneer formulation comprising:

a hydraulic binder, which includes at least a natural hydraulic lime of NHL grade 3.5, the hydraulic binder in an amount between about 3 wt. % and about 16 wt. % based on a dry weight of the formulation; and an aggregate comprising natural limestone, the aggregate being initially screened with a mesh that is a number 6 mesh, a number 40 mesh or a mesh of a size there between, wherein the aggregate is in an amount between about 70 wt. % and about 90 wt. % based on the dry weight of the formulation; and a pozzolan reactant, wherein the reactant is in an amount so that the ratio of reactant to natural hydraulic lime is between 1:2.5 to 2.5:1; and a bonding agent selected from the group consisting of polyvinyl acetate and polyvinyl alcohols, wherein the bonding agent is in the amount up to about 5% of the weight of the dry formulation;

calcium stearate in an amount that is between about 0.1% to about 5% of the weight of the dry formulation; and water in an amount to form a slurry having solids content when wet of between about 60 wt. % and about 90 wt. %.

\* \* \* \* \*